United States Patent

[11] 3,602,691

[72] Inventor Richard R. Frazier
P.O. Box 20261, Station N., Atlanta, Ga. 30325
[21] Appl. No. 865,673
[22] Filed Oct. 13, 1969
[45] Patented Aug. 31, 1971

[54] ELECTRICAL HOT PLATE ASSEMBLY FOR LUNCH BOXES
5 Claims, 4 Drawing Figs.

[52] U.S. Cl. .................................................. 219/387,
126/262, 219/447, 219/464, 219/523, 219/536, 312/236
[51] Int. Cl. ............................................. F27d 11/02, A21b 1/52
[50] Field of Search ................................. 219/386-7, 345, 35, 260, 4-7, 541, 521-3, 464, 447, 403, 536-7, 533, 227; 312/244, 236; 220/17; 206/.4

[56] References Cited
UNITED STATES PATENTS
| | | | |
|---|---|---|---|
| 2,274,285 | 2/1942 | Walker | 219/464 X |
| 2,572,163 | 10/1951 | Lamb | 219/543 X |
| 2,611,851 | 9/1952 | Lott | 219/387 |
| 2,704,319 | 3/1955 | Lott | 219/387 |
| 2,713,111 | 7/1955 | McCreary | 219/387 |
| 2,766,367 | 10/1956 | Chaustowich | 219/523 |
| 2,976,390 | 3/1961 | Stump | 219/387 |
| 3,076,304 | 2/1963 | Fisher | 220/17 X |

Primary Examiner—Volodymyr Y. Mayewsky
Attorney—Patrick F. Henry

ABSTRACT: An attachable and detachable hot plate assembly for a conventional lunchbox to which it is removably attached by means of small brackets with spring hangers that are mounted and insulated so as to be usable with plastic lunch boxes. By means of a special support arrangement the hot plate assembly fits most any standard lunch box and will adjust so as to be flush. Handles are provided so that the hot plate assembly is removable for use elsewhere and the electrical system includes a thermostat switch. The entire unit is assembled and disassembled readily into three basic parts, one of which is the electrical heating unit that also is readily disassembled.

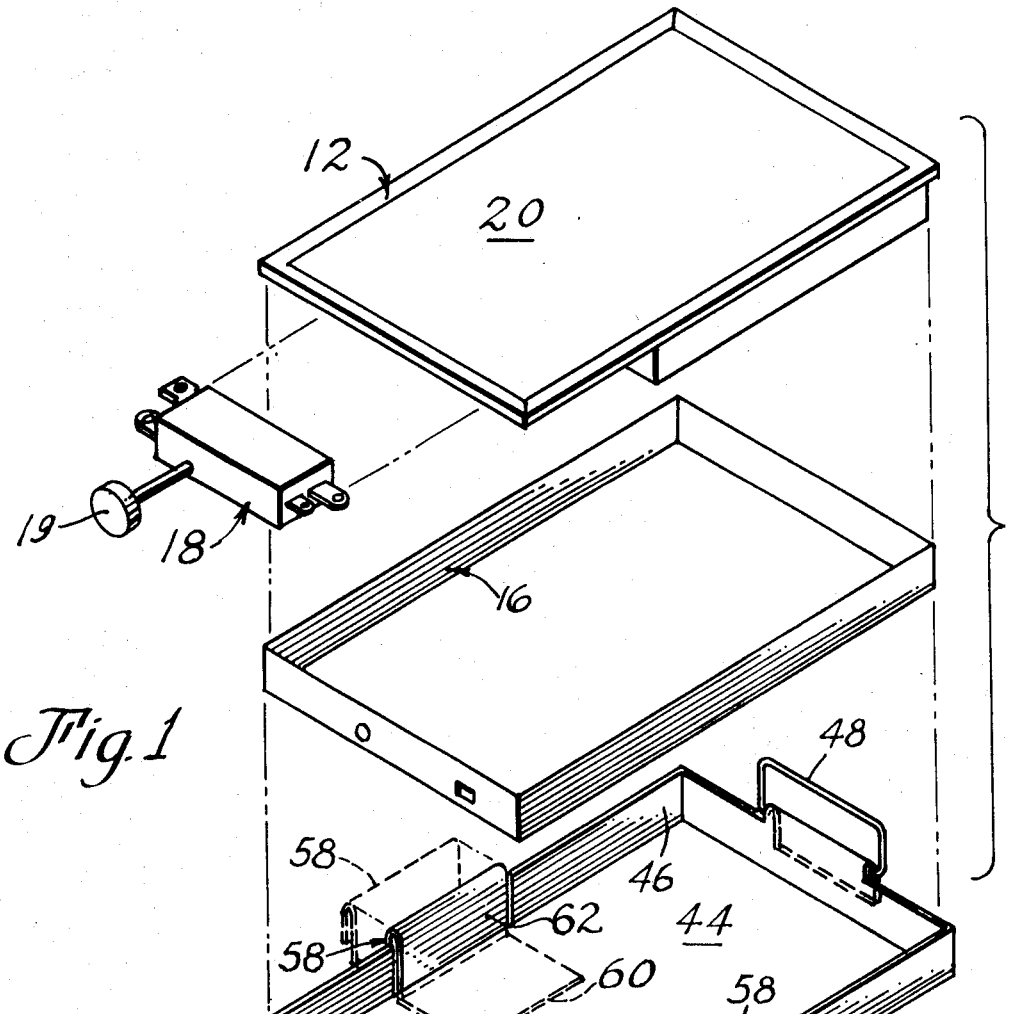
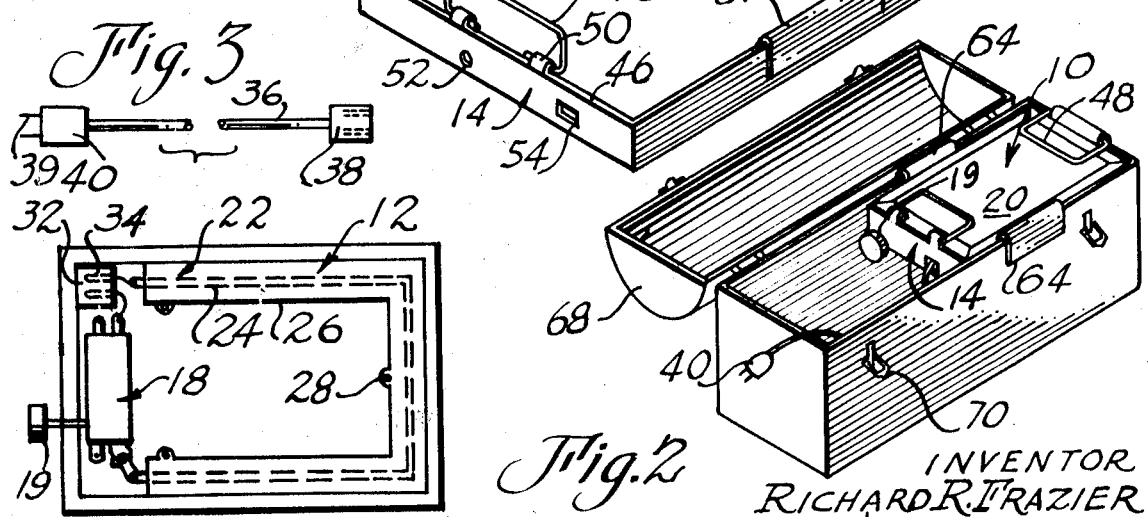
INVENTOR
RICHARD R. FRAZIER
BY [signature]
ATTORNEY

3,602,691

ELECTRICAL HOT PLATE ASSEMBLY FOR LUNCH BOXES

BACKGROUND OF THE INVENTION

1. Field of the Invention

Electrical heating unit, especially those that are removable or portable.

2. Description of the Prior Art

There are numerous patents on lunch boxes with special heating means, including the following U.S. Pat. Nos. 2,976,390; 2,713,111; 2,704,319; 2,543,524; 2,512,712; 2,839,654; 2,820,878; and 2,690,497. Most lunch box heating devices are not removable and if removable do not fit different boxes. U.S. Pat. No. 2,713,111 presents a heating element for use with the standard lunch box but it fits in the bottom of the box and is not as convenient as well as being questionable as to the heat produced, especially for plastic boxes. The present heating element solves existing problems of heat control as well as suitable positioning in most standard boxes as well as easy attachment and detachment for other use.

Summary of Invention

A heating device for lunch boxes comprising an assembled unit consisting of a heating element and a support means for said element, said support means including a tray with a bottom to protect the element with hangers on at least three sides for attachment to the respective edges of a conventional lunch box. The hangers being insulated with asbestos or the like from the lunch box whereby heat will not accumulate sufficiently to damage same. The heating element is a substantially flat, rectangular arrangement which is mounted in the tray along with a control switch and an intermediate insert so as to easily and properly assemble the heating element. The problem of assembly and disassembly has been solved by this arrangement and the problem of heat transfer to the box has been eliminated.

BRIEF DESCRIPTION OF THE DRAWINGS

FIG. 1 is a disassembled assembly view in perspective of the heating assembly.

FIG. 2 is a perspective view of the heating assembly mounted in a typical, conventional lunch box.

FIG. 3 is a plan view of the electrical cord.

FIG. 4 is a plan view of the heating element part of the heating element assembly.

DESCRIPTION OF A PREFERRED EMBODIMENT

The complete assembly of the heating arrangement is designated generally by reference number 10 and comprises three primary parts: the heating element unit 12, the bottom tray or pan 14 and the heat resisting insert 16. The heating element unit 12 includes a conventional thermostat control switch 18 having control knob 19.

Heating element unit 12 includes a hot plate 20, which is the heated surface that may be Teflon-coated to prevent sticking. A conventional heating element 22 may be 900 watts (120 volts AC) and is obtainable from many manufacturers of small appliances including hot plates and the like. Heating element wires 24 of conventional construction are covered by a shield 26 of metal or asbestos and the entire element 22 is mounted by lugs 28 and suitable fasteners like sheet metal screws or the like. A male plug 32 has opposed prongs 34 which are attached respectively to a wire to complete the circuit through the heating wires 24. A rubber or plastic appliance cord 36 has a female socket 38 to removable plug into the plug 32 and prongs 39 another male plug 40 on the other end to fit into a conventional room outlet.

The support means for the heating element unit 12 is a tray 44 made from metal or the like with peripheral sides 46 forming a rectangular opening a little larger than the hot plate 20 into which the plate 20 fits. Opposite ends of the sides 46 have foldable handles 48 comprising bent wires mounted in loops 50. There is a hole 52 for the shaft of the switch 18 and another hole 54 for the electrical cord 36. Tray 44 is mounted removably on the lunch box 56 by means of small metal brackets 58 each comprising an inwardly extending plate portion 60 and an upwardly extending plate portion 62 and a bent hanger portion 64 which fits over the edge of the lunch box.

EXAMPLE

A conventional 10-inch lunch box was provided with a hot plate 20 and the entire assembly of the heating element 12 was about 5¼ inches long.

Switch 18 can be a thermocontact switch or a three-position current-limiting switch. Preferably, it would be capable of not only breaking the circuit in the heating element 24 but also of controlling the temperature at a fixed maximum whereby the unit can be left on without danger of overheating. There is enough space in the hangers 64 to fit almost any existing lunch box, that is, slight differences in width between conventional boxes are adjusted for and compensated for by the gap in each hanger 64 and the entire assembly 10 fits flush in the top of the lunch box so that the lid 68 closes and the latches easily latch. Larger adjustment is effected by moving one bracket 58 through side 46 as shown in the dotted lines of FIG. 1. There is very little interference with the interior of the lunch box.

While I have described and shown a particular lunch box hot plate, this is by way of illustration only and does not constitute any sort of limitation on the scope of my invention as there are many changes which may be made is design, size, shape and additions and substitutions or the like.

What is claimed:

1. For an electrically heated lunch box of the type having a compartment and a removable hot plate assembly covering the opening to said compartment and being adjacent to at least three edges of the wall around the opening, said hot plate assembly comprising:
  a. a bottom tray;
  b. a heating element unit removably positioned in said tray and comprising an electrical heating element and a hot plate surface;
  c. switch means attached to said heating element unit, said switch means having electrical control means therewith for disconnecting said heating element from an electric supply and thermostat means for controlling the limit of heating thereof;
  d. an electric wire cable electrically connected to the switch means and the heating element having a plug for attachment to the electrical supply outlet such as a room outlet;
  e. insert means positioned in said tray and thermally insulating said tray from the heating element unit; and
  f. bracket support means detachably mounted on said tray and comprising hangers each having opposed portions with a gap therebetween for detachable attachment over at least one edge of the lunch box to support the hot plate assembly, whereby said entire hot plate assembly may be removed and adjusted to fit another lunch box of a different size, one of said hangers being movable therefor.

2. The device as defined in claim 1 wherein said hot plate assembly has folding handles thereon by means of which said hot plate assembly may be positioned, lifted and repositioned 3. The device as defined in claim 1 wherein said hangers are curved members having an inwardly extending portion, an upwardly extending portion and a bent portion forming a space in which the edge of the lunch box fits.

4. The device as defined in claim 1 wherein said insert means positioned in said tray encloses said heating element unit from the bottom and the sides thereof.

5. The device as defined in claim 1 wherein said heating element unit having a recessed plug and said wire cable having a female socket for detachable attachment and electrical connection with said plug.